Oct. 5, 1937.        W. A. GALE        2,094,881
METHOD OF PREPARING POTASSIUM PENTABORATE
Filed Oct. 18, 1935        2 Sheets-Sheet 1

SYSTEM
$K_2B_{10}O_{16}-Na_2B_{10}O_{16}-$
$K_2Cl_2-Na_2Cl_2$
35°C

SYSTEM
$K_2B_{10}O_{16}-Na_2B_{10}O_{16}-$
$Na_2Cl_2-K_2Cl_2-H_2O$
50°C

INVENTOR.
William A. Gale
BY Lyon & Lyon
ATTORNEYS

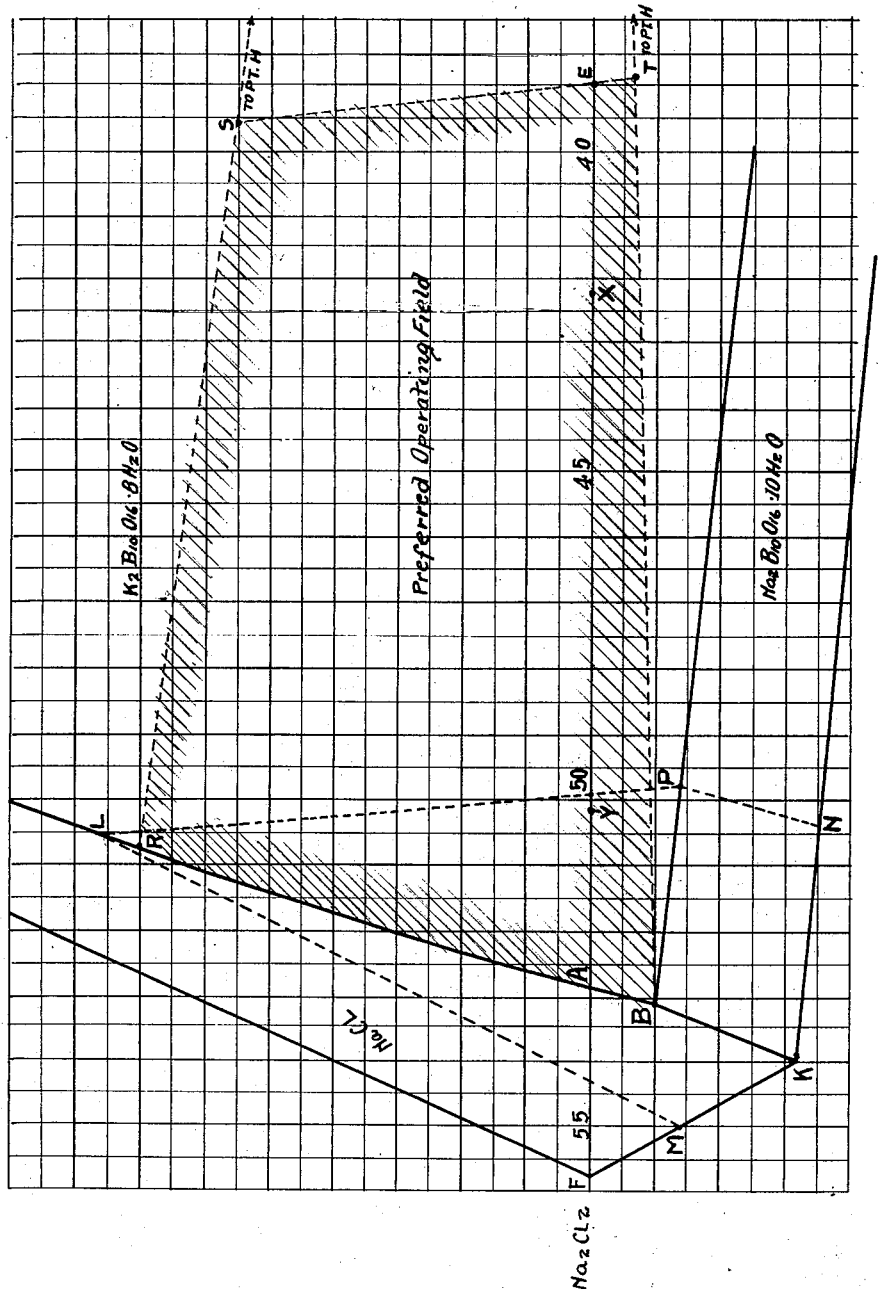

Patented Oct. 5, 1937

2,094,881

UNITED STATES PATENT OFFICE

2,094,881

METHOD OF PREPARING POTASSIUM PENTABORATE

William A. Gale, Trona, Calif., assignor to American Potash & Chemical Corporation, Trona, Calif., a corporation of Delaware Application October 18, 1935, Serial No. 45,557

19 Claims. (Cl. 23—59)

This invention relates to a method of preparing potassium pentaborate.

It is the principal object of the present invention to provide a method of manufacturing potassium pentaborate in which a high efficiency is obtained and little material is lost in the process, except sodium chloride.

Potassium pentaborate is a product which is of value for different commercial purposes, for example, the ceramic industries, but heretofore there has been no economical method of manufacturing this material. Attempts to manufacture potassium pentaborate by reacting borax and potassium chloride with sulphuric acid in the presence of water and cooling the solution to precipitate potassium pentaborate have resulted in low efficiency because the solution rapidly reaches saturation with either sodium sulphate or glaserite. Moreover, these processes are limited by the thickness of the sludge of crystals precipitated.

Briefly stated, the present invention consists in the discovery that highly efficient production of potassium pentaborate may be secured by reacting potassium chloride and sodium pentaborate or mixtures of sodium borate and boric acid together, provided the solution is brought within certain limits of concentration of the ingredients more particularly hereinafter referred to.

This may be accomplished in one manner by first preparing boric acid by suitable efficient means from borax, separating the boric acid from the remainder of the reaction mixture and then reacting the separated boric acid with a further quantity of borax or other sodium borate more alkaline than the pentaborate to produce an acid borate solution, preferably corresponding essentially to the pentaborate, from which potassium pentaborate may be precipitated by double decomposition with potassium chloride. By operation of this latter step within a certain limited portion of the potassium pentaborate field on the solubility diagram for the system, I have been able to obtain greater ease of operation and higher yields of both potassium and boron values than would otherwise be possible.

A more complete understanding of my invention will be given in connection with the solubility diagrams which form the drawings, in which,—

Figure 1:
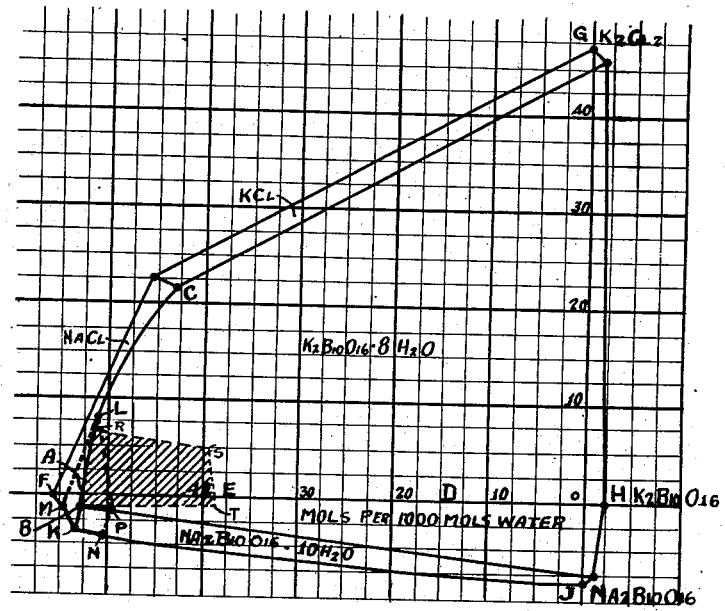
Figure 2:
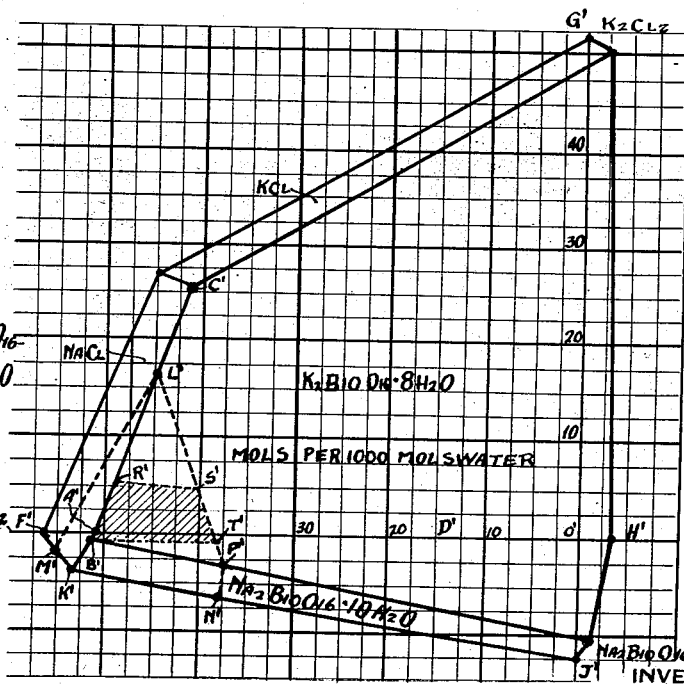

Figure 1 is the solubility diagram for the system $H_2O$ and $K_2B_{10}O_{16}$—$Na_2B_{10}O_{16}$—$K_2Cl_2$—$Na_2Cl_2$ at 35° C., Figure 2 is the solubility diagram for the system $H_2O$ and $K_2B_{10}O_{16}$—$Na_2B_{10}O_{16}$—$K_2Cl_2$—$Na_2Cl_2$ at 50° C., and Figure 3 is an enlarged drawing of a portion of Figure 1.

These solubility diagrams forming Figures 1 and 2 of the drawings are in the form of the usual diagram of four rectangular axes, which is commonly employed in depicting the solubility relations in a reciprocal salt pair, a special case of a four component system. When a system is one dealing with reciprocal salt pairs, any set of analytical data for a solubility point may be expressed in terms of not more than three of the salts involved. It is this fact which is relied upon in drawing up the present diagrams. Thus, in the present case the equation is:

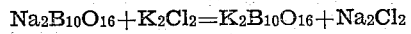
$$Na_2B_{10}O_{16} + K_2Cl_2 = K_2B_{10}O_{16} + Na_2Cl_2$$

and the reciprocal salt pairs are:

$$Na_2B_{10}O_{16}—K_2Cl_2 \text{ and } K_2B_{10}O_{16}—Na_2Cl_2$$

In plotting the solubility data on a four axis figure, it will be understood that the resultant diagram is in reality the projection of a solid figure and that a given point in the plane figure is actually the projection of a point on a perpendicular to the plane. The distance of the point on the perpendicular from the plane is equivalent to the sum total of the mols of all salts represented by that point. Thus, in the diagram of Figure 1, point C represents concentration in mols per 1,000 mols of water as follows:

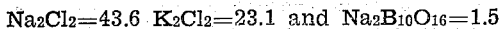
$$Na_2Cl_2 = 43.6 \quad K_2Cl_2 = 23.1 \text{ and } Na_2B_{10}O_{16} = 1.5$$

or, more rigorously,

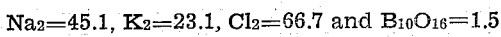
$$Na_2 = 45.1, \; K_2 = 23.1, \; Cl_2 = 66.7 \text{ and } B_{10}O_{16} = 1.5$$

On the plane figure, therefore, point C is 23.1—1.5 or 21.6 mols along the $K_2Cl_2$ axis and 43.6 mols along the $Na_2Cl_2$ axis, and in the solid figure would be a point 68.2 mols upward on a perpendicular to the plane at the point C. More complete solubility data for the system shown in Figure 1 is given in "Industrial Development of Searles Lake Brine" by John E. Teeple, at pages 136–137, and the diagrams of Figures 1 and 3, with the exception of points L, M, N, and P, and the shaded portion, which will be explained later, have been plotted from these data. The diagram of Figure 2 has been similarly constructed from hitherto unpublished data.

Referring now to the diagrams of Figures 1, 2, and 3, it will be seen that a solution containing equimolecular quantities of $K_2Cl_2$ and $Na_2B_{10}O_{16}$ is represented by the origin, point O in Figure 1 and point O' in Figure 2. These points thus represent the starting points of prior processes, as they employed a starting reaction mixture of substantially equimolecular quantities of potassium chloride and sodium pentaborate. The effect, on the diagrams, of causing crystallization of potassium pentaborate from such a solution would be to cause the point representing the composition of the remaining solution to move along the line OF or O'F', i. e. away from the points H or H' which represent the starting point of crystallization of the compound $K_2B_{10}O_{16}.8H_2O$. At point H (35° C.) the $K_2B_{10}O_{16}$ concentration is 2.0 mols per 1,000 mols of water; at point H' (50° C.) 3.0 mols per 1,000 mols of water.

The extent to which the liquor composition point moves away from the origin will be dependent upon the concentrations of $K_2Cl_2$ and $Na_2B_{10}O_{16}$ present at the start, larger starting concentrations producing greater quantities of $K_2B_{10}O_{16}.8H_2O$ and causing the liquor composition end point to move farther away from the origin. Previous investigators have attempted to produce potassium pentaborate by first heating the reaction mixture to produce a solution of the reacting constituents at or near the origin, i. e., substantially equi-molecular quantities of $K_2Cl_2$ and $Na_2B_{10}O_{16}$ and then cooling to cause crystallization of $K_2B_{10}O_{16}.8H_2O$ along the line OD, the point D being some point relatively close to the origin. It was necessary to stop at a relatively nearby point such as D because of the limited extent to which potassium pentaborate can be crystallized from such a solution by cooling to ordinary temperatures and also due to the difficulties in handling and removing mother liquor from a sludge of very heavy consistency, such as would be formed if the path of crystallization were to extend to some more distant point beyond D.

In carrying out the process in such a manner, producing a mother liquor of composition represented by some nearby point, as D for example, I have found that an appreciable proportion of the potassium pentaborate remains in solution in the mother liquor and the efficiency of the process is accordingly poor as compared with the results obtainable by the improved process of my invention.

I have found that a highly efficient method is made possible by carrying out the entire process in a portion of the $K_2B_{10}O_{16}.8H_2O$ field removed from the origin O and preferably in that portion of the field in which the sodium chloride concentrations are highest and the potassium concentrations lowest. In the diagrams of Figures 1 and 2, the portion of the $K_2B_{10}O_{16}.8H_2O$ field in which it is preferred to operate is in the lower left-hand corner, in which, portions of each diagram at this point have been shaded. In general, it may be said that I find it particularly satisfactory to employ a starting solution containing sufficient sodium chloride so that the final mother liquor will contain a high sodium chloride concentration without involving high sludge densities. I prefer, however, to operate so that the final mother liquor composition approaches that represented by point B or B' at which the sodium chloride concentration is highest and the potassium and boron concentration lowest. In this way, potassium and boron concentrations in the mother liquor, which represent losses, are less and the efficiency of the process consequently high.

The execution of this process so as to provide a mother liquor as set forth above is accomplished by control of the concentrations of the various components in the starting solution and of the quantities of reactants added thereto for forming the potassium pentaborate. In general, it can be said that the concentration of sodium chloride in the starting solution and the quantities of potassium and boron reacting ingredients should be such that substantial saturation with sodium chloride in the final mother liquor results without the precipitation of any solid other than potassium pentaborate. The proportion of potassium and boron reagents added need not necessarily be in accordance with the exact stoichiometric quantities required by the equation, but any excess chloride or sodium ion present should not be sufficient to cause precipitation of a contaminating ingredient. Greatest efficiency is obtained when the quantities of sodium chloride, potassium and boron compounds present in the mother liquor are such as to provide a composition lying within the shaded area RSTB of the diagrams of Figures 1 and 3 or a similar area of the diagram for other temperatures of equilibrium. It will be seen that greater efficiencies result with higher sodium chloride concentrations in the final mother liquor, as the corresponding potassium ion concentrations are lower therewith.

My improved process comprises, in one form, starting with a solution containing at least a specific minimum number of mols of $Na_2Cl_2$ per 1,000 mols of $H_2O$, but which is not saturated with this salt, and which may also contain minor amounts of potassium and pentaborate ions. To this starting solution, I add borax, boric acid and potassium chloride preferably in approximately the stoichiometric proportions required to satisfy the equation:

(2) $Na_2B_4O_7 + 6H_3BO_3 + 2KCl = K_2B_{10}O_{16} + 2NaCl + 9H_2O$ and in such amounts as to produce a total sodium chloride concentration less than saturation therewith, though preferably just less than saturation, in the mother liquor after crystallization of $K_2B_{10}O_{16}.8H_2O$ has been completed. In the example given, the pentaborate concentration has been provided by the interaction of borax and boric acid. It will be understood that this is only by way of example and that the pentaborate may be provided in any manner desired so long as the other solubility relationships in the system are observed. The sodium chloride saturation values necessary for determination of the quantities of reagents to employ may be obtained directly from the solubility data for the system, 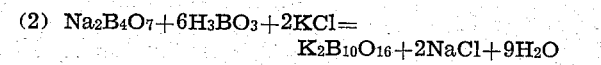 at the temperature at which the potassium pentaborate is crystallized. Thus, if the process is carried out so that the mother liquor reaches equilibrium at 35° C., the sodium chloride saturation values for all solutions saturated with $K_2B_{10}O_{16}.8H_2O$ and NaCl at 35° C. may be found from the compositions of such solutions lying along the curve BC of Figure 1. A number of approximate compositions of such points are given in the following table in the form of the hypothetical combinations shown.

| Point | Concentration (Mols per 1000 mols $H_2O$) | | |
|---|---|---|---|
| | $Na_2Cl_2$ | $K_2Cl_2$ | $Na_2B_{10}O_{16}$ |
| B | 53.1 | 2.6 | 3.6 |
| A | 52.8 | 3.4 | 3.4 |
|  | 52.3 | 5.0 | 2.9 |
|  | 51.7 | 6.6 | 2.5 |
|  | 51.1 | 8.2 | 2.2 |
| R | 50.8 | 9.1 | 2.1 |
| L | 50.6 | 9.5 | 2.0 |
|  | 48.9 | 13.7 | 1.6 |
| C | 43.6 | 23.1 | 1.5 |

The approximate compositions of intermediate points may be obtained by interpolation between the above data.

In carrying out my process, the quantity of potassium pentaborate which may be crystallized from a unit volume of solution will be determined by the composition of the starting solution and the mother liquor composition which will provide the greatest overall efficiency of the process.

The most efficient mother liquor composition will be dependent upon the relative costs of the starting ingredients. If we assume that the end liquor is saturated with sodium chloride and potassium pentaborate, its composition will lie along the curve CB. It will be apparent, however, that generally it will be undesirable to operate so as to obtain an end liquor composition along the upper part of the curve CB, as from C to L, because of the high potassium values represented thereby.

Since appreciable variations in the concentrations of the three components exist for points B and L, which represent generally satisfactory end-points, the most efficient end point composition will be that which represents the lowest monetary values in terms of the starting ingredients and is, therefore, dependent upon the relative costs of the starting ingredients.

Since the end products of the reaction are sodium chloride and potassium pentaborate, the amount of pentaborate which may be crystallized per unit volume of solution will be directly proportional to the amount of sodium chloride which may be added to the starting solution without causing deposition of a phase other than potassium pentaborate octohydrate. Consequently, lower sodium chloride concentrations in the starting solution will permit heavier yields, but I have found it advisable to limit the sludge density of the mixture of crystallized potassium pentaborate and mother liquor to not over 30% suspended solids by weight. In order to do this, the yield should be limited to about 19 mols of $K_2B_{10}O_{16}.8H_2O$ per 1,000 mols of $H_2O$ remaining in the mother liquor. Since efficiency, however, is dependent upon the end liquor composition, I have found that the sodium chloride concentration in the starting solution should be at least 43 mols of $Na_2Cl_2$ per 1,000 mols of $H_2O$ in the case where fully hydrated borax and boric acid are used, if satisfactory end liquor compositions are to be obtained without encountering sludge densities in excess of 30% solids by weight. In other words, if lower sodium chloride concentrations are employed in the starting solution, and saturation with this salt is approached in the mother liquor, the sludge density after crystallization of potassium pentaborate octohydrate will be so great that separation of the latter from the mother liquor will be undesirably difficult.

In defining the minimum sodium chloride concentration which may be employed in accordance with the concepts of my invention, it is necessary to consider the amount of water which will be released during the subsequent conversion reaction during which the potassium pentaborate is formed. It will be noted from Equation (2) that nine mols of $H_2O$ are released for each mol. of pentaborate formed by the reaction of anhydrous sodium tetraborate and boric acid. Essentially, eight of these nine mols of $H_2O$ are subsequently extracted by the crystallization of $K_2B_{10}O_{16}.8H_2O$, leaving approximately one mol. of water for which sufficient sodium chloride must be formed to cause saturation therewith, if efficient end liquor compositions are to be obtained. When, however, borax (or sodium tetraborate decahydrate) is employed instead of anhydrous sodium tetraborate, it will be noted from Equation 3:

(3) $Na_2B_4O_7.10H_2O + 6H_3BO_3 + 2KCl =$
$K_2B_{10}O_{16} + 2NaCl + 19H_2O$ that nineteen mols gross of $H_2O$ are released, leaving a net of practically eleven mols of water added after allowing for the water extracted by the crystallization of $K_2B_{10}O_{16}.8H_2O$, which net water should also be saturated by sodium chloride formed during the reaction. In the first case, a lower sodium chloride concentration in the starting solution should be used than in the second case, while producing the same total quantity of potassium pentaborate octohydrate per unit volume of solution handled, that is, while handling substantially equal sludge densities. I have chosen to express the minimum sodium chloride concentration in the starting solution on the basis of a process using fully hydrated borax and boric acid to form the pentaborate ions. This minimum value is approximately forty-three mols of $Na_2Cl_2$ per 1,000 mols $H_2O$ on the basis of nineteen mols gross of $H_2O$ released per mol. of pentaborate formed during the subsequent conversion. If less water is released during the conversion, as would be the case with borax of a lower degree of hydration, then a proportionately lower minimum sodium chloride concentration should be employed as the starting solution. For example, in the case in which anhydrous borax is used, as shown in Equation 2, I find that a minimum of thirty-five mols of $Na_2Cl_2$ per 1,000 mols $H_2O$ will result in approximately the same sludge density (about 30% solids by weight) as in the above case in which decahydrate borax is used with a starting solution containing forty-three mols of $Na_2Cl_2$ per 1,000 mols $H_2O$, both end liquors being essentially saturated with respect to sodium chloride.

As an example of my process, it will be assumed that the process is carried out at 35° C., that a starting solution containing 2.89 mols of $K_2B_{10}O_{16}.8H_2O$ and 45.25 mols of $Na_2Cl_2$ per 1,000 mols of $H_2O$ is employed, and that it is desired to produce an end liquor containing 52.7 mols of $Na_2Cl_2$ per 1,000 mols of $H_2O$ and saturated with $K_2B_{10}O_{16}.8H_2O$. The starting solution composition is represented by point $x$ on the diagram of Figure 3 and the end point by point $y$. The starting solution given is one which approximates a solution obtained by dilution of an end liquor as hereinafter described. When no end liquor is available, the starting solution may be obtained by dissolution of sodium chloride in water, and there will then be no potassium or pentaborate ions present.

To a starting solution of composition $x$, I add sodium tetraborate, boric acid and potassium chloride in approximately the stoichiometric proportions necessary to satisfy Equation (3) above. The quantities of these several ingredients to be added will be those which will cause the production of sufficient sodium chloride to cause its concentration in the end liquor to be 52.7 mols per 1,000 mols of $H_2O$. Since the quantities added will depend upon the degree of hydration of the sodium tetraborate, the calculation will be made for any degree of hydration by writing Equation (3) to show the water of crystallization of the borax for any degree of hydration and the water of crystallization removed by the crystallization of the potassium pentaborate thus:

(4) $Na_2B_4O_7.(c-1)H_2O + K_2Cl_2 + 6H_3BO_3 =$
$K_2B_{10}O_{16}.8H_2O + Na_2Cl_2 + cH_2O$ where $c$ will have a value between 1 (for anhydrous tetraborate) and 11 (for the decahydrate) inclusive. In case wet borax is used, that is, decahydrate borax having free moisture present on the surface of the crystals, such as the undried product of a filter or centrifugal machine, due allowance should be made for the excess water by making the value of $c$ somewhat greater than 11 in order that the formula $Na_2B_4O_7 \cdot (c-1)H_2O$ may express the actual composition of the wet borax used. For example, material consisting of 90% $Na_2B_4O_7 \cdot 10H_2O$ and 10% free water would be expressed by the formula $Na_2B_4O_7$ 12.35 $H_2O$ and the value of $c$ would be: 13.35.

If $a$ and $b$ are the concentrations of $Na_2Cl_2$ in mols per 1,000 mols $H_2O$ in the starting solution and end liquor, respectively, then the number of mols $M$ of $Na_2B_4O_7$ $(c-1)$ $H_2O$ which are to be added per 1,000 mols of $H_2O$ in the starting solution, to give the desired end liquor, may be calculated from the formula:

$$M = \frac{1,000(b-a)}{1,000-cb}$$

The number of mols of $K_2Cl_2$ to be added will also equal $M$, while the molal quantity of boric acid ($H_3BO_3$) will be $6M$. However, I have found it necessary to limit the quantity of reactants added in order not to result in an excessive sludge density, of which I have found 30% solids by weight to be about the maximum for satisfactory operation. In order to determine the approximate value of $M$ for any given value of $c$ which will result in approximately a 30% sludge, the following formula may be used:

$$M = \frac{19,000}{1,000-19c}$$

This does not take into consideration the small amount of potassium pentaborate remaining in the end liquor which would tend to reduce the yield and sludge density to a slight degree.

The approximate $Na_2Cl_2$ concentration desired for the starting solution is then obtained by the formula—

$$a = b + M\left(\frac{bc}{1,000} - 1\right)$$

As previously indicated, the value of $a$ should not be less than 43 when $c=11$, or less than about 35 when $c=1$ In the specific example given, the molal quantities of reagents per 1,000 mols $H_2O$ in the starting solution are as follows:

$Na_2B_4O_7 \cdot 10H_2O$, 17.5; $K_2Cl_2$, 17.5; $H_3BO_3$, 105.

To 2,036 grams of starting solution of the composition given, I add 212.7 grams of KCl, 549.0 grams of $Na_2B_4O_7 \cdot 10H_2O$, and 529.6 grams of $H_3BO_3$. The borax and boric acid are preferably added first and the mixture agitated to dissolve as much as possible of the solids. The dissolution of the borax and boric acid is an endothermic reaction and as a consequence some heat, either originally present in the starting solution or added during the reaction, will be necessary to keep the temperature of the reaction substantially at the desired point, 35° C. in the present case. Considerable leeway, however, is possible, as the solubility characteristics of the system do not vary rapidly with changes of temperature such as from 35° C. to 50° C. After addition of the borax and boric acid, the potassium chloride is added, preferably gradually and with agitation to permit thorough reaction to take place. Sufficient agitation should be provided to permit the solution and solids to substantially complete the reaction before separation of the crystallized potassium pentaborate octohydrate from the mother liquor by suitable means. This period of agitation should not be too long, however, owing to the metastable nature of this portion of the potassium pentaborate field, as will be hereinafter described. I have found that by this process it is possible to obtain high yields of potassium pentaborate which is especially pure, containing only traces of impurities, such as sodium chloride.

End liquor from a previous batch may be conveniently employed for forming the starting solution of a new batch. When end liquor is used, it must be diluted to reduce the sodium chloride concentration to the desired value, not less than thirty-five mols of $Na_2Cl_2$ per 1,000 mols of water where anhydrous borax is to be used, or not less than forty-three mols of $Na_2Cl_2$ per 1,000 mols of $H_2O$ where the decahydrate is to be used. Since the volume of the starting solution is also increased by water formed during the reaction, it will be necessary to discard sufficient end liquor to eliminate the total chloride ion added, that is, the $Na_2Cl_2$ formed.

The diagrams shown in Figures 1 and 2 have been drawn up on the basis of existing solubility data, but it has more recently been found that a portion of each of the fields for the three phases $K_2B_{10}O_{16} \cdot 8H_2O$, NaCl and $Na_2B_{10}O_{16} \cdot 10H_2O$, in the neighborhood of the junction of these three fields is in reality metastable, being supersaturated with respect to a new sodium borate compound of formula $Na_6B_{16}O_{27} \cdot 10H_2O$. The discovery of this compound is set forth in a copending application for U. S. Letters Patent of Henry Bruno Suhr, Serial No. 5,539 filed Feb. 8, 1935. In the diagram of Figure 1, this $Na_6B_{16}O_{27} \cdot 10H_2O$ field is shown by the dotted lined area MNLP, while in Figure 2, at 50° C., the same field is the area M'N'L'P'. Of particular importance in my process is the fact that a portion of my preferred operating field is included in this $Na_6B_{16}O_{27} \cdot 10H_2O$ field at 35° C., while at 50° C. practically all of my preferred range of operation lies within this metastable field. Also, owing to the depressing effect of NaCl on the transition point of the new compound, it can form at temperatures well below 33° C., which is approximately the temperature of its transition point in pure solution. Therefore, point B, being saturated with NaCl, is metastable at all ordinary temperatures.

The tendency for this new borate compound to remain supersaturated is fairly great at ordinary temperatures if seeding therewith is avoided. Also, its rate of crystal growth is quite slow at ordinary temperature, although crystallizing with ease at higher temperatures. By taking suitable precautions to prevent the release of supersaturation with respect to this new sodium polyborate compound, such as preventing seeding therewith and with relatively rapid and efficient separation of mother liquor from the crystallized $K_2B_{10}O_{16} \cdot 8H_2O$, I have found that satisfactory crystallization and separation of potassium pentaborate may be accomplished in this metastable portion of the field, thereby obtaining high efficiencies, as described herein.

After separating the crystallized $K_2B_{10}O_{16} \cdot 8H_2O$ from the mother liquor at or near the sodium chloride concentration represented by point B, a portion of this liquor is drawn off; this portion being of such volume as to contain an amount of sodium chloride approximately equal to that contained in the original starting solution. The remaining portion of the mother liquor may be discarded, or evaporated for the recovery of the sodium chloride content, while to the first portion there is added an amount of fresh water approximately equal to that contained in the discarded portion of the liquor less that released in the reaction. In this way a suitable starting liquor for the next batch of the process is obtained. It will be seen, therefore, that the process becomes cyclical wherein the by-product sodium chloride is removed in the form of a solution of high concentration in which the solubility of potassium pentaborate is quite low at ordinary temperatures. In practice, I have found it possible to obtain a recovery efficiency of 90 to 93 per cent of both the potassium and boron values of the raw materials by this method.

As previously set forth, higher efficiencies will result if the process is controlled so that the path of crystallization of the $K_2B_{10}O_{16}.8H_2O$ is maintained approximately along the portions EA of the axis OF of the diagram (in Figure 1) or slightly below this line in order to more closely approach the preferred end point B. This can be done by using a starting solution, the composition of which is represented by a point falling on or slightly below the $Na_2Cl_2$—$K_2B_{10}O_{16}$ axis, OF in Figure 1 or Figure 3, such as point T, and by adding essentially the stoichiometric proportions of borax, boric acid and KCl; that is, the $Na_2B_4O_7$, $H_3BO_3$ and KCl should be in the molecular proportions of 1:6:2, which corresponds to a ratio of $Na_2O$ to $B_2O_3$ (and, likewise, of $K_2O$ to $B_2O_3$) of 1:5. It will be understood, however, that these represent preferred conditions and that starting solutions represented by points somewhat above the axis OF may be satisfactorily employed. Also, some variation from $Na_2O:B_2O_3$ ratio of 1:5 is permitted, it being recognized that ratios of from 1:3–1:10 have been employed in the prior art.

Although much of the description given herein has related to operation at 35° C., it will be understood that this has been only for illustration purposes and that either higher or lower temperatures, such as any ordinary temperatures from 20° C. to 40° C., or higher, may be employed. Also, in place of borax and boric acid, the pentaborate may be provided in other well known manners as adding sodium pentaborate or forming the pentaborate from other borates and acids; in such cases, the reaction must, of course, be carried out in the manner described in order to obtain high efficiencies and to avoid the formation of the compound $Na_6B_{16}O_{27}.10H_2O$.

I have found that it is not necessary to heat the mixture of starting solution and added salts in order to obtain satisfactory conversion to solid potassium pentaborate octohydrate and dissolved sodium chloride. With mechanical agitation sufficient to keep the crystals in suspension in the liquor, heating and cooling may be dispensed with, thereby effecting further economy. A further advantage of operating so as to avoid having to heat the pentaborate solution to higher temperatures is that the danger of precipitating other alkali borates, such as the polyborate previously mentioned, is greatly reduced.

I claim:

1. The process of producing potassium pentaborate, which comprises reacting a solution containing potassium pentaborate and at least 35 mols of $Na_2Cl_2$ per 1,000 mols of $H_2O$ with potassium chloride, boric acid and a sodium borate more basic than sodium pentaborate, the proportions of boric acid and sodium borate being such as will form sodium pentaborate and the proportion of potassium chloride being substantially equivalent to said sodium pentaborate, and crystallizing potassium pentaborate octohydrate from said reaction mixture, the quantities of potassium chloride, boric acid and sodium borate being less than will cause the sodium chloride saturation value in the mother liquor to be exceeded.

2. The process of producing potassium pentaborate, which comprises adding sodium tetraborate, boric acid and potassium chloride in proportions to form potassium pentaborate to a starting solution containing potassium pentaborate and between 35 and 50 mols of $Na_2Cl_2$ per 1,000 mols of $H_2O$, crystallizing potassium pentaborate octohydrate from said reaction mixture and separating the crystallized potassium pentaborate, the quantities of reagents added to the starting solution being less than will cause the sodium chloride present to exceed its saturation value in the mother liquor.

3. The process of producing potassium pentaborate, which comprises adding sodium tetraborate decahydrate, boric acid and potassium chloride in substantially stoichiometric proportions to a starting solution containing potassium pentaborate and between 43 and 50 mols of $Na_2Cl_2$ per 1,000 mols of $H_2O$, crystallizing potassium pentaborate octohydrate from said reaction mixture and separating the crystallized potassium pentaborate, the quantities of reagents added to the starting solution being less than will cause the sodium chloride present to exceed its saturation value in the mother liquor.

4. A cyclic process of producing potassium pentaborate, which consists in adding borax, boric acid and potassium chloride in approximately stoichiometric proportions to a starting solution containing potassium pentaborate and between 43 and 50 mols of $Na_2Cl_2$ per 1,000 mols of water, the quantities of reagents added being insufficient to cause the sodium chloride saturation value in the mother liquor to be exceeded, agitating the mixture to aid dissolution and recrystallization, separating the crystallized potassium pentaborate octohydrate from the mother liquor and finally adding water to a portion of said mother liquor to regenerate the said starting solution.

5. A cyclic process of producing potassium pentaborate, which consists in adding borax, boric acid and potassium chloride in approximately the molecular proportions of

$$Na_2B_4O_7.10H_2O:6H_3BO_3:2KCl$$

to a starting solution containing potassium pentaborate and between 43 and 50 mols of $Na_2Cl_2$ per 1,000 mols of water, the quantities of reagents added being less than will cause the sodium chloride saturation value in the mother liquor to be exceeded, rapidly agitating the mixture at ordinary temperatures to aid dissolution and recrystallization, rapidly separating the crystallized potassium pentaborate octohydrate, whereby crystallization of a stable sodium polyborate compound is avoided, and finally adding water to a portion of the said mother liquor to regenerate the said starting solution.

6. The method of producing potassium pentaborate, which comprises reacting sodium pentaborate and potassium chloride, in the presence of an aqueous solution containing potassium pentaborate and at least 35 mols of $Na_2Cl_2$ per 1,000 mols of water, the quantity of potassium chloride being sufficient to combine with the total sodium pentaborate present, such quantities being less than those required to cause the formation of sodium chloride in excess of its saturation value in the mother liquor, and crystallizing potassium pentaborate octohydrate from said solution.

7. The method of producing potassium pentaborate, which comprises reacting approximately M mols of sodium tetraborate each having $(c-1)$ mols of water of hydration, 6M mols of boric acid and M mols of $K_2Cl_2$, at ordinary temperatures, with an aqueous starting solution containing potassium pentaborate and "$a$" mols of $Na_2Cl_2$ and 1,000 mols $H_2O$, the quantities being such that $$M=\frac{1,000(b-a)}{1,000-cb}\text{ per 1,000 mols }H_2O\text{ in said starting solution}$$

and is not greater than $$\frac{19,000}{1,000-19c}\text{ per 1,000 mols }H_2O\text{ in said starting solution}$$

where "$a$" is at least as great as 35, where "$b$" represents the total mols of $Na_2Cl_2$ present per 1,000 mols of $H_2O$ in the final mother liquor, and where said amount of sodium chloride in the mother liquor is not in excess of saturation therein, and separating the crystallized potassium pentaborate octohydrate therefrom.

8. The cyclic method of producing potassium pentaborate, which comprises reacting approximately the proportions of M mols of $Na_2B_4O_7(c-1)H_2O$, 6M mols of $H_3BO_3$ and 2M mols of KCl, at ordinary temperatures, with an aqueous starting solution containing potassium pentaborate and "$a$" mols of $Na_2Cl_2$ and 1,000 mols of $H_2O$, the quantities being such that $$M=\frac{1,000(b-a)}{1,000-cb}\text{ per 1,000 mols }H_2O\text{ in said starting solution}$$

where M is less than $$\frac{19,000}{1,000-19c}\text{ per 1,000 mols }H_2O\text{ in said starting solution}$$

where "$b$" represents the concentration of $Na_2Cl_2$ in the mother liquor in mols per 1,000 mols of $H_2O$, and where "$a$" and "$b$" lie between the limits of 35 and 53, separating the crystallized potassium pentaborate octohydrate from the mother liquor before the crystallization of a stable sodium polyborate occurs, and finally diluting a portion of said mother liquor with sufficient water to regenerate the said starting solution.

9. The method of producing potassium pentaborate by double decomposition between sodium pentaborate and potassium chloride, which consists in carrying out the reaction in the presence of a solution containing potassium pentaborate and at least 35 mols of $Na_2Cl_2$ per 1,000 mols of $H_2O$, in excess of that liberated in the reaction, the quantities of said reactants being such that the saturation value of sodium chloride in the mother liquor is not exceeded, and separating the crystallized potassium pentaborate from said mother liquor.

10. The method of producing potassium pentaborate, which comprises reacting sodium pentaborate and potassium chloride in the presence of an aqueous solution containing potassium pentaborate and sufficient sodium chloride to approach saturation therewith in the final mother liquor, controlling the quantities of reactants so that the crystallized potassium pentaborate octohydrate will form with the mother liquor a sludge of consistency at least as small as 30% and separating the crystallized potassium pentaborate octohydrate from the mother liquor.

11. The method of producing potassium pentaborate, which comprises reacting borax and boric acid with potassium chloride in the presence of a solution containing potassium pentaborate and at least 43 mols of $Na_2Cl_2$ per 1,000 mols of water, the quantity of potassium chloride being substantially equivalent stoichiometrically with the quantity of sodium pentaborate formed by the borax and boric acid, limiting the quantities of reactants so that the saturation value of sodium chloride in the final mother liquor is not exceeded, crystallizing potassium pentaborate octohydrate from the reaction mixture and recovering the same.

12. The method of producing potassium pentaborate, which comprises reacting sodium tetraborate containing $(c-1)$ mols of water of hydration, boric acid and potassium chloride with an aqueous starting solution containing potassium pentaborate and "$a$" mols of $Na_2Cl_2$ per 1,000 mols of water, the quantity of sodium tetraborate being equivalent to $$\frac{1,000(b-a)}{1,000-cb}\text{ per 1,000 mols }H_2O\text{ in said starting solution}$$

and at least as small as $$\frac{19,000}{1,000-19c}\text{ per 1,000 mols }H_2O\text{ in said starting solution}$$

where "$a$" is at least as great as 35, where "$b$" represents the total mols of $Na_2Cl_2$ present per 1,000 mols of $H_2O$ in the final mother liquor and where said amount of sodium chloride is less than the saturation value therein and recovering the crystallized potassium pentaborate octohydrate.

13. The method of producing potassium pentaborate, which comprises reacting sodium tetraborate containing $(c-1)$ mols of water of hydration, boric acid and potassium chloride with an aqueous starting solution containing potassium pentaborate and "$a$" mols of $Na_2Cl_2$ per 1,000 mols of water, the quantity of potassium chloride being substantially twice the molar quantity of sodium tetraborate, the quantity of sodium tetraborate being substantially equivalent to $$\frac{1,000(b-a)}{1,000-cb}\text{ per 1,000 mols }H_2O\text{ in said starting solution}$$

and at least as small as $$\frac{19,000}{1,000-19c}\text{ per 1,000 mols }H_2O\text{ in said starting solution}$$

where "$a$" is at least as great as 35, where "$b$" represents the total mols of $Na_2Cl_2$ present per 1,000 mols of $H_2O$ in the final mother liquor and where said amount of sodium chloride is less than the saturation value therein and recovering the crystallized potassium pentaborate octohydrate.

14. The method of producing potassium pentaborate, which comprises reacting sodium pentaborate and potassium chloride in the presence of an aqueous solution containing potassium pentaborate and sufficient sodium chloride to approach saturation therewith in the final mother liquor, controlling the quantities of reactants so that the crystallized potassium pentaborate octohydrate will form with the mother liquor a sludge of consistency at least as small as 30% and so that the quantity of potassium chloride is sufficient to react with substantially all of the sodium pentaborate present and separating the crystallized potassium pentaborate octohydrate from the mother liquor.

15. The method of producing potassium pentaborate by double decomposition between sodium pentaborate and potassium chloride, which comprises carrying out the reaction in the presence of an aqueous solution containing potassium pentaborate and sodium chloride, controlling the quantities of reactants so that the saturation value of sodium chloride in the final mother liquor is not exceeded and so that the crystallized potassium pentaborate will form with the mother liquor a sludge of consistency at least as small as 30%, the quantity of sodium chloride in said aqueous solution being at least sufficient to cause the saturation value therewith in the final mother liquor to be approached when a sludge of thirty per cent consistency is obtained.

16. The method of producing potassium pentaborate by double decomposition between sodium pentaborate and potassium chloride, which comprises carrying out the reaction in the presence of an aqueous solution containing potassium pentaborate and sodium chloride, controlling the quantities of reactants so that the saturation value of sodium chloride in the final mother liquor is not exceeded so that the quantity of potassium chloride is substantially equivalent stoichiometrically with the quantity of sodium pentaborate present and so that the crystallized potassium pentaborate will form with the mother liquor a sludge of consistency at least as small as 30%, the quantity of sodium chloride in said aqueous solution being at least sufficient to cause the saturation value therewith in the final mother liquor to be approached when a sludge of thirty per cent consistency is obtained.

17. In the production of potassium pentaborate by double decomposition between sodium pentaborate and potassium chloride, improvements which comprise carrying out the reaction in the presence of a solution containing potassium pentaborate and sufficient sodium chloride to approach saturation therewith in the final mother liquor and controlling the quantities of reactants so that there will be formed sufficient crystallized potassium pentaborate octohydrate to make with the mother liquor a sludge of consistency at least as small as 30% and a mother liquor having a potassium content expressed as $K_2Cl_2$ of less than about 10% and a boron content expressed as $Na_2B_{10}O_{16}$ of less than about 4%.

18. The method of producing potassium pentaborate by double decomposition between sodium pentaborate and potassium chloride which comprises carrying out the reaction in the presence of a solution containing potassium pentaborate and an amount of sodium chloride at least as large as $$\frac{e-19}{1{,}000-19y}$$

mols $Na_2Cl_2$ per 1,000 mols $H_2O$ where "$e$" is the maximum concentration of $Na_2Cl_2$ in solutions in which potassium pentaborate octohydrate is a stable solid phase at the temperature at which the crystallization is effected and "$y$" is the number of mols $H_2O$ provided by the reaction, the quantities of reactants being controlled so that the amount of sodium chloride in the mother liquor does not exceed saturation therein and separating the crystallized potassium pentaborate octohydrate from said mother liquor.

19. The method of producing potassium pentaborate which comprises reacting sodium tetraborate containing $(c-1)$ mols of water of hydration, boric acid and potassium chloride with a starting solution containing potassium pentaborate and a quantity of sodium chloride at least as large as $$\frac{e-19}{1{,}000-19c}$$

mols $Na_2Cl_2$ per 1,000 mols $H_2O$ where "$e$" is the maximum concentration of $Na_2Cl_2$ in solutions for which potassium pentaborate octohydrate is the stable solid phase at the temperature at which the crystallization is effected, the quantities of reactants being controlled so that the amount of sodium chloride in the mother liquor does not exceed saturation therein and separating the crystallized potassium pentaborate octohydrate.

WILLIAM A. GALE.